Patented Nov. 2, 1926.

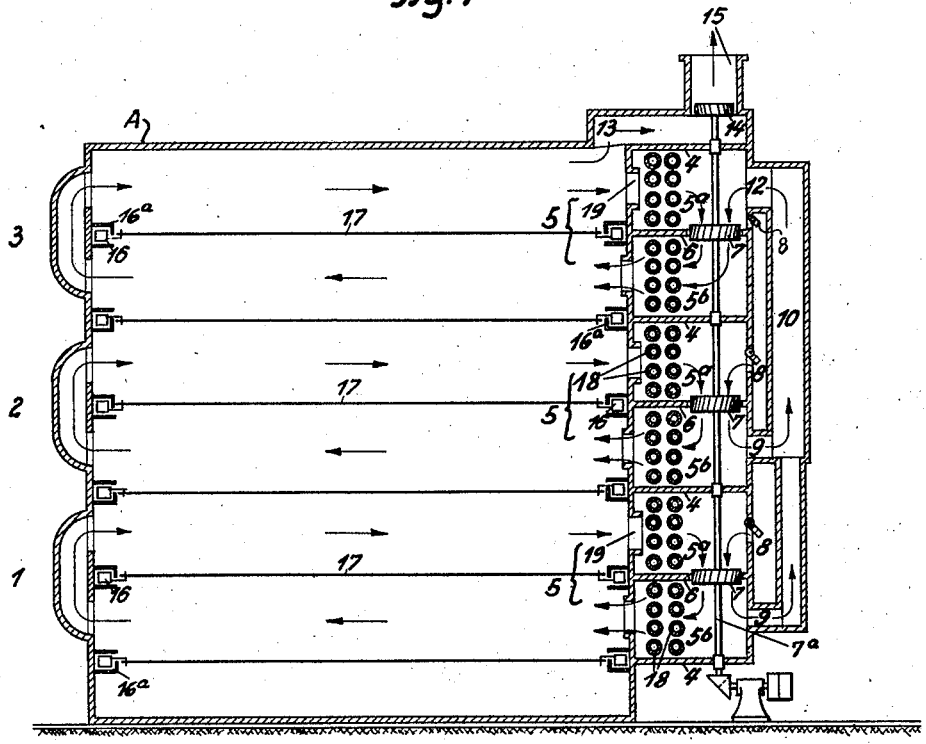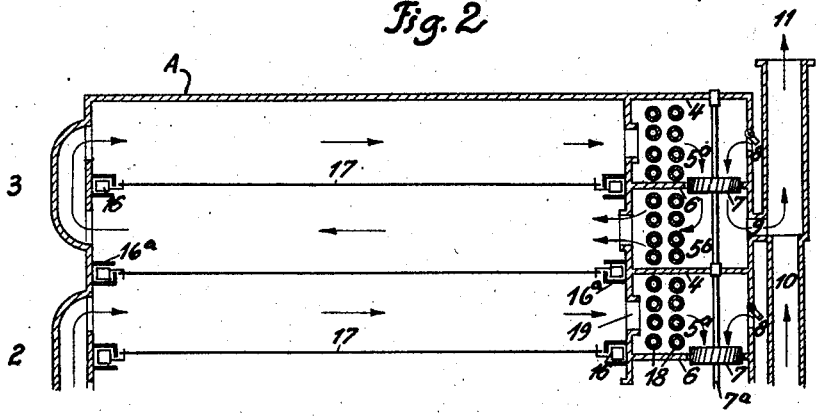

1,605,039

UNITED STATES PATENT OFFICE.

HUBERT KRANTZ, OF AACHEN, GERMANY.

TENTERING AND DRYING MACHINE.

Application filed January 22, 1926, Serial No. 83,082, and in Germany August 13, 1924.

This invention relates to tentering and drying machines.

It is customary to dry moisture-laden textile fabrics by means of hot air in sections comprising a preliminary and a main drying section. In the main section the drying is effected by circulating air, the exhaust air being mixed with fresh air and heated and thereupon returned to the main section. The amount of exhaust air in excess corresponding to the amount of fresh air admixed, is passed to the preliminary drying section after it has likewise been mixed with fresh air and heated. The two sections are therefore partly connected in series with regard to the use of the exhaust air of the main section, while they are connected in parallel as regards the admission of fresh air. According to the total number of stages of the drying machine, each section consists of one or more stages. In the latter case the several stages of each section are connected in parallel, the fresh air and exhaust air, respectively, being admitted by controllable means from or led off by a collecting pipe.

The invention has for its object to provide a machine of the kind stated in which all of the stages are connected in parallel and each stage has fed to it only heated fresh air besides its own exhaust air. Only the uppermost stage, which may be called the wet section, may be supplied with the collected exhaust air of the other stages. This construction offers the advantage that the efficiency and economy of the machine are increased; besides, the several stages are rendered independent one from the other as regards the temperature and moisture of the air admitted and discharged.

The parallel connection of the stages according to the invention also avoids the disadvantages of the machines in which all stages are connected in series. In such a machine, the fresh air required for the whole drying process successively flows through all stages with a constant speed. As therefore the quantity of air passing from one stage to the other is the same for all stages, satisfactory allowance cannot be made for the greatly different requirement of drying in the different stages. Moreover, the moisture taken up by the air in one stage has to be carried along by the air through all following stages. This moisture does not only constitute a useless ballast for the air but it reduces also the efficiency and economy.

Another object of the invention is to arrange all heating compartments with their heating tubes and the openings for the fresh air, exhaust air and circulating air as well as the fans carried by a rotary shaft in one shaft-like chest, whereby space, power and heat are saved.

The invention is illustrated by way of example in the accompanying drawing in which:

Fig. 1 is a vertical section, partly diagrammatic, through a three-stage tentering and drying machine according to the invention, and Fig. 2 is a similar section through the upper part of a slightly modified machine.

A is an inclosure comprising three stages 1, 2, 3 each of which is provided with a special heating compartment 5. The compartments 5 are separated by walls 4 and superimposed so as to form a common shaft-like chest. Each heating compartment is subdivided by a partition 6 into a suction chamber 5$^a$ and a pressure chamber 5$^b$. Arranged in an opening of the partitions 6 between each suction and pressure chamber 5$^a$, 5$^b$ is a fan 7. All fans 7 are fastened on a shaft 7$^a$ driven by any suitable means. Each suction chamber 5$^a$ has a controllable inlet 8 for fresh air and each pressure chamber 5$^b$ an outlet 9 for exhaust air. The outlets 9 open into a collecting pipe 10. According to Fig. 2 the pipe 10 has an outlet 11, while in Fig. 1 the pipe 10 is connected by a pipe 12 with the suction chamber 5$^a$ of the uppermost stage 3. If, in the last-said case, it is desired to have the exhaust air circulate in the uppermost stage, the top of the inclosure A is formed with an exhaust channel 13 and provided with a fan 14 designed to continuously withdraw moisture-laden air from the stage 3 and pass it into an outlet 15. The fan 14 is preferably mounted on the shaft 7$^a$ as in the other heating compartments. The compartment associated with the uppermost drying stage 3 may also be provided with an inlet for fresh air and an outlet for exhaust air.

As shown in the drawing, the heating surface required for each heating compartment and formed by heating tubes 18 is uniformly distributed in the suction chamber 5$^a$ and pressure chamber 5$^b$.

According to the drawing, the several heating compartments 5$^a$, 5$^b$ with their heating tubes 18, inlet openings 8 for fresh air, outlet openings 9 for discharge air, openings 19 for connecting the compartments with the stages 1, 2, 3 of the inclosure A and shaft 7ᵃ with the fans 7, 14 are arranged in one shaft-like chest. This chest is shown to be arranged closely beside the drying machine. In case it is not feasible to arrange the heating compartments in a common chest, the several heating compartments together with their fan and associated parts may be arranged separately at other places in the room at disposal.

The operation of the machine is as follows: It is assumed that the moisture-laden textile goods 17 is introduced in a well-known manner into the uppermost stage 3 by means of suitable chains 16 between which it is fastened. The chains run in chainways 16ᵃ arranged in the inclosure A in such a manner as to cause the fabric 17 to pass to and fro in horizontal spaced layers through the machine to the lowermost stage from which it is withdrawn in a dry state.

Independent currents of air heated in the heating compartments 5ᵃ, 5ᵇ are caused by the fans 7 to circulate in the stages 1, 2, 3, each air current independently sucking in fresh air through the opening 8 of the suction chamber 5ᵃ and discharging consumed air through the opening 9 of the pressure chamber 5ᵇ. The discharged currents of air are collected in the pipe 10. The heat contained in the accumulated exhaust air is fully utilized by causing the exhaust air to be introduced through the pipe 12 into the suction chamber 5ᵃ of the uppermost stage 3, as shown in Fig. 1. In this chamber the exhaust air, with or without an addition of fresh air, is reheated and caused by the associated fan 7 to circulate in the uppermost stage 3 for preliminarily drying the very wet fabric in that stage until the air has adopted the most favorable degree of saturation, while part of the air is continuously being withdrawn from the stage 3 by the fan 14 and discharged through the opening 15 into the atmosphere. The exhaust air accumulated in the pipe 10 may also be utilized for other purposes. This may be effected by supplying the exhaust air to the place of use through the outlet 11 shown in Fig. 2. In this case, the third stage must likewise be provided with a fresh air inlet 8 and an exhaust opening 9 communicating with the collecting pipe 10.

Having thus described my invention, what I claim as new and desire to secure by Letters-Patent, is:—

1. A tentering and drying machine comprising in combination, an inclosure, a plurality of parallelly connected drying stages in the inclosure, an air heating compartment associated with each stage, controllable fresh air inlet openings and exhaust air discharge openings for certain of the heating compartments, and a fan in each compartment for circulating air in each drying stage.

2. A tentering and drying machine comprising in combination, an inclosure, a plurality of parallelly connected drying stages in the inclosure, an air heating compartment associated with each stage, controllable fresh air inlet openings and exhaust air discharge openings for certain of the heating compartments, an exhaust air collecting pipe connected with all of the said discharge openings, and a fan in certain of the heating compartments for circulating in certain of the drying stages a current of air composed of exhaust air of the respective stage and an admixture of fresh air and for discharging the excess amount of air into the exhaust air collecting pipe.

3. A tentering and drying machine comprising in combination, an inclosure, a plurality of parallelly connected drying stages in the inclosure, an air heating compartment associated with each stage, controllable fresh air inlet openings and exhaust air discharge openings for certain of the heating compartments, an exhaust air collecting pipe connected with all of the said discharge openings, a connecting pipe between the exhaust air collecting pipe and the heating compartment of the uppermost drying stage for supplying the exhaust air of all stages to the uppermost stage, a fan in each heating compartment for circulating a current of air in each drying stage, and a fan in the top of the inclosure for continuously withdrawing moisture-laden air from the uppermost drying stage.

4. A tentering and drying machine comprising in combination, an inclosure, a plurality of parallelly connected drying stages one above another in the inclosure, an upright shaft-like chest divided into a plurality of superimposed heating compartments, communication openings between each drying stage and a heating compartment each, fresh air inlet openings and exhaust air discharge openings associated with certain of the heating compartments, an exhaust air collecting pipe connected with all of the said discharge openings, a driven shaft extending vertically through and mounted in the shaft-like chest, fans carried by said shaft and operating respectively in each heating compartment for circulating in each drying compartment a separate current of air and discharging air in excess into the exhaust air collecting pipe.

In testimony whereof I have signed my name to this specification.

Dr. HUBERT KRANTZ.